US011000043B2

(12) United States Patent
Riessbeck et al.

(10) Patent No.: US 11,000,043 B2
(45) Date of Patent: May 11, 2021

(54) BAKING DEVICE AND OPERATING METHOD

(71) Applicant: Eugster / Frismag AG, Amriswil (CH)

(72) Inventors: Wolfgang Riessbeck, Landschlacht (CH); Simon Wäger, Amriswil (CH); Christof Zwahlen, Romanshorn (CH)

(73) Assignee: Eugster / Frismag AG, Amriswil (CH)

( * ) Notice: Subject to any disclaimer, the term of this patent is extended or adjusted under 35 U.S.C. 154(b) by 73 days.

(21) Appl. No.: 16/489,373

(22) PCT Filed: Mar. 2, 2017

(86) PCT No.: PCT/EP2017/054867
§ 371 (c)(1),
(2) Date: Aug. 28, 2019

(87) PCT Pub. No.: WO2018/157930
PCT Pub. Date: Sep. 7, 2018

(65) Prior Publication Data
US 2019/0373902 A1 Dec. 12, 2019

(51) Int. Cl.
*A21B 5/03* (2006.01)
*A21D 13/43* (2017.01)
(Continued)

(52) U.S. Cl.
CPC .............. *A21B 5/03* (2013.01); *A21B 7/005* (2013.01); *A21C 11/004* (2013.01); *A21D 13/43* (2017.01)

(58) Field of Classification Search
CPC .......... A21B 5/03; A21B 7/005; A21D 13/43; A21C 11/004
See application file for complete search history.

(56) References Cited

U.S. PATENT DOCUMENTS

2016/0324165 A1* 11/2016 Li ........................... A21B 5/03

FOREIGN PATENT DOCUMENTS

| DE | 102015205706 A1 | 10/2016 |
| WO | 2013124809 A2 | 8/2013 |

OTHER PUBLICATIONS

International application No. PCT/EP2017/054867 dated Nov. 14, 2017.

* cited by examiner

*Primary Examiner* — Steven N Leff
(74) *Attorney, Agent, or Firm* — Bachman and Lapointe PC; George Coury

(57) ABSTRACT

A domestic baking device for baking a food product, in particular a flat bread, from a dough portion initially held in a portion capsule (2), the domestic baking device comprising a baking apparatus for baking the dough portion and a capsule-emptying apparatus (7) for removing the dough portion from a portion capsule (2), the capsule-emptying apparatus (7) having at least one force application element, which can be moved along a movement path, for applying force to, in particular deforming and/or moving, the portion capsule (2), which force application element can be driven by means of an electric motor, characterized in that the capsule-emptying apparatus (7) is assigned monitoring means for monitoring the portion capsule emptying operation, the monitoring means comprising comparing means, which are designed to monitor the curve of an electrical motor signal, in particular a current or voltage signal, over the movement path of the force application element for the reaching or exceeding of a reference signal (12), which changes over the movement path of the force application element, and to perform an action if the reference signal (12) is reached or exceeded.

20 Claims, 1 Drawing Sheet

(51) Int. Cl.
*A21B 7/00* (2006.01)
*A21C 11/00* (2006.01)

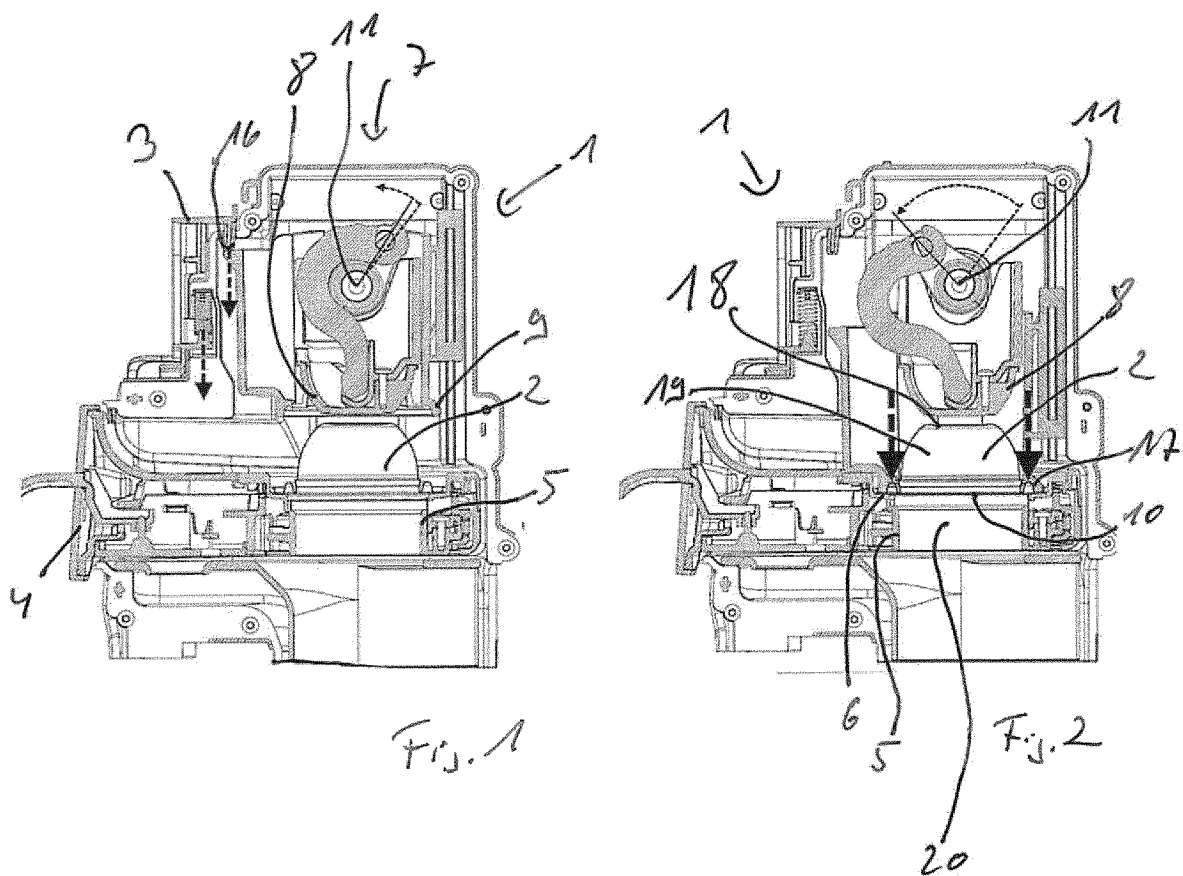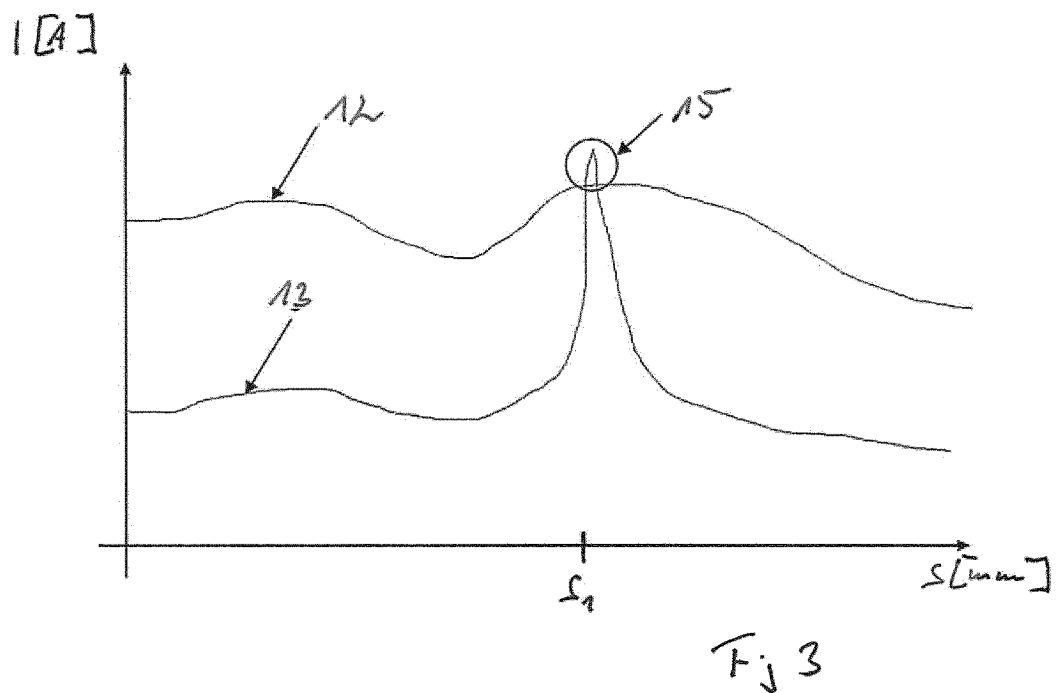

BAKING DEVICE AND OPERATING METHOD

CROSS-REFERENCE TO RELATED APPLICATIONS

This application is a National Phase Application of PCT International Application No. PCT/EP2017/054867, International Filing Date, Mar. 2, 2017, which is hereby incorporated by reference in its entirety.

BACKGROUND OF THE INVENTION

The invention relates to a domestic baking device for baking a food product, in particular a flat bread, from a dough portion initially held in a portion capsule, the domestic baking device comprising a baking apparatus for baking the dough portion, in particular after a preceding flattening, in particular a rolling or pressing of the dough portion, and a capsule-emptying apparatus for removing the dough portion from the portion capsule, the capsule-emptying apparatus having a force application element, which can be moved along a movement path (relative to the portion capsule when the portion capsule is positioned in the device), for applying force to, in particular deforming and/or moving and/or clamping, the portion capsule, which force application element can be driven by means of an electric motor.

Additionally, the invention relates to a method for operating a domestic baking device, in particular a domestic baking device according to the invention, for baking a food product, in particular a flat bread, a force application element in a capsule-emptying apparatus of the domestic baking device for removing a dough portion from a portion capsule being driven by means of an electric motor in such a manner that it is moved, in particular translationally or alternatively along an at least partially curved track, along a movement path relative to the portion capsule and it applies force to the portion capsule.

From WO 2013/124809 A2, a domestic flat bread baking device is known in which a dough portion is removed from a portion capsule by a plunger applying force to the portion capsule. Problems can arise if the capsule-opening process is performed on other portion capsules than those defined and provided by the manufacturer and/or if portion capsules with a frozen dough portion are used. There is a risk that the components involved in the capsule-opening process are subjected to incorrect loads or overloads, which can cause deformation or destruction of the components involved. An incorrect positioning of an otherwise proper capsule can also cause incorrect loads. This can also lead to deformation or destruction of the components involved in the capsule-opening process.

SUMMARY OF THE INVENTION

Starting from the aforementioned state of the art, the object of the invention is to indicate an alternative and improved domestic baking device, in particular for producing flat bread, which is configured in such a manner that the use of improper portion capsules and/or an incorrect positioning of portion capsules and/or the use of portion capsules with a frozen dough portion does/do not cause damage to components involved in the portion capsule-opening process. The object is also to indicate an accordingly improved operating method for a domestic baking device ensuring that damage to components during the capsule-opening process is reliably prevented.

Concerning the domestic baking device, said object is attained by the features disclosed herein, i.e., in a generic domestic baking device, by assigning monitoring means for monitoring the capsule-emptying process to the capsule-emptying apparatus, the monitoring means comprising comparing means which are designed to monitor a curve of an electrical motor signal, in particular a current or voltage signal, in particular a current consumption signal, over the movement path of the force application element for the reaching or exceeding of a reference signal, which changes over the movement path of the force application element, and to perform or to be designed to perform an action if the reference signal is reached or exceeded.

Concerning the method, the object is attained by the features disclosed herein, i.e. that in a generic method, a curve of an electrical motor signal, in particular a current or voltage signal, preferably a current consumption signal, over the movement path of the force application element is monitored for the reaching or exceeding of a reference signal, which changes over the movement path, and that an action is performed if the reference signal is reached or exceeded.

Advantageous embodiments of the invention are disclosed in the dependent claims. All combinations of at least two features disclosed in the description, the claims and/or the figures constitute part of the scope of the invention.

In order to avoid repetitions, disclosed features relating to the device are also seen as relating to the method and are thus also claimable therefor. In the same manner, disclosed features relating to the method are also seen as relating to the device and are thus also claimable therefor.

The idea of the invention is to detect an electrical motor signal, in particular a current or voltage signal, particularly preferably a current consumption signal of the electric motor for driving the at least one force application element, during the capsule-opening process and to compare it to a reference or limit value for the respective movement position of the force application element along the movement path towards the portion capsule or a blade for puncturing a lid film of the capsule or a capsule support for the portion capsule. If the motor signal measured or provided by control means, in particular motor signal levels or values, is equal to or greater than the respective position-specific target or reference value, i.e. the reference signal matched with the corresponding movement position of the force application element, an error or a hazard is detected and an action is performed, such as the outputting of a visual and/or acoustic and/or haptic warning signal and/or the actuating of the electric motor in such a manner that the movement of the force application element towards the portion capsule (or towards a blade and/or a capsule support) is stopped or slowed down and/or by moving or driving the force application element back to its initial position.

In other words, the domestic baking device is realized and/or operated in such a manner that the capsule-emptying process of the capsule-emptying apparatus is monitored. For that purpose, corresponding monitoring means comprising a microcontroller are provided relating to the device, the monitoring means preferably comprising comparing means configured to monitor a curve of the electrical motor signal of the electric motor, in particular a current or voltage signal, preferably a current consumption signal, over the movement path of the force application element for the reaching or exceeding of a reference signal changing over the movement path of the force application element and to perform an action if the reference signal is reached or exceeded. The invention is based on the realization that the signal level of the electrical motor signal, in particular of the current signal, defines the effective torque of the electric motor. If the torque of the electric motor increases, the motor signal (or the motor signal level), in particular the current consumption, also increases. If a force is exerted on or applied to the portion capsule by the force application element during the opening of the capsule in order to empty said capsule, in particular to deform the portion capsule and/or to press it against a capsule support and/or a blade, the torque of the motor also increases. As a result, the motor signal of the electric motor of the force application element also increases. Likewise, the torque and therefore the motor signal of the electric motor increase if the force application element of the capsule-opening unit comes into contact with a resistance, such as a foreign object, and presses against said resistance.

Relating to the invention, it is essential that the motor signal, i.e. a motor signal level, is not compared to a fixed or constant reference value, but that the current motor signal or a respective current motor signal level is instead compared to a reference signal dependent on the position of the force application element, i.e. to respective reference values changing over the movement path depending on the movement position. The reference signal changes depending on the position or results from the torques to be expected at different movement positions of the force application element along the movement path and, therefore, from motor signals or motor signal levels during the opening process and from safety factors. As an example, only torques or motor signal levels, in particular current consumption levels of the electric motor, are expected during the movement of the force application element from an initial position to the first contact of the force application element with the portion capsule, since only the frictional resistance of the system has to be overcome in this first movement section of the force application element along the movement path. If the current consumption, in particular, (improperly) increases in this movement section and exceeds at least one limit or reference value assigned to this first movement section, it can be deduced that the driven components of the capsule-opening apparatus have met with (improper) resistance. Possible resistances are, for example, the aforementioned foreign portion capsules or foreign objects, an incorrectly positioned portion capsule or a frozen dough portion. Once the at least one force application element has come into contact with the portion capsule, an increasing torque and thus an increasing motor signal, in particular an increasing current consumption, are expected, which is characterized by an increased reference signal or reference values of this movement section; i.e. the limit value that must be exceeded as of the moment of contact with the capsule in order for an error to be detected and an action to be performed is higher than in the preceding movement section.

The domestic baking device according to the invention comprises a baking body, in particular a baking chamber for baking the dough portion. Additionally, the domestic baking device particularly preferably comprises forming means for forming the dough portion, in particular for flattening the dough portion, before and/or during the baking process, in which the dough portion is heated to a temperature of more than 150° C., particularly preferably between 180° C. and 280° C., in particular between two baking plates of the baking body. It is particularly preferred if the forming means are an integral part of the baking body, in particular as the baking plates between which the dough portion is deformed, particularly pressed.

In regard to the specific realization of the at least one force application element, different possibilities are available. According to a first realization variation of the device and the operating method, a plunger which can be driven by means of an electric motor along the movement path, for example translationally, to apply force to, in particular deform, the portion capsule in order to push the dough portion out of the portion capsule is provided for use as the force application element. It is also possible to provide a holding-down punch, which can be or is moved relative to the portion capsule by means of an electric motor along the movement path to apply force to the portion capsule, in particular at a radially projecting peripheral edge on which, particularly preferably, a lid film of the portion capsule is sealed, in particular on a side turned away from a surface of attack of the holding-down punch, as a force application element. Force is applied to the capsule, for example by the holding-down punch being moved translationally along the movement path, and the capsule is moved against a blade, in particular a ring blade, of the domestic baking device in order to puncture a lid film of the portion capsule and thus to open the capsule and/or to move the capsule against a capsule support in order to position the portion capsule or to clamp it between the holding-down punch and the capsule support. It is generally possible to provide either a plunger or (i.e. alternatively) a holding-down punch as the force application element. In a preferred embodiment, the domestic baking device comprises both a plunger and a holding-down punch which are movable by means of an electric motor. In this regard, it is possible to assign respective electric motors to both the plunger and the holding-down punch and to monitor the motor signal of both electric motors or of only one electric motor according to the teaching of the invention. In a particularly preferred embodiment, the plunger and the holding-down punch can be or are moved by means of a common, in particular single, electric motor and the plunger and the holding-down punch are mechanically coupled, a motor signal of the common electric motor being monitored according to the invention in this case. Irrespective of whether the plunger and the holding-down punch can be moved along respective movement paths by means of a common electric motor or a separate electric motor, it is preferred if they are arranged relative to one another or operatively connected to one another in such a manner that the plunger and the holding-down punch can be moved relative to one another and relative to the portion capsule or to a blade for puncturing the lid film of the capsule and/or a capsule support. In a particularly preferred embodiment, the plunger is arranged in a holding-down punch, which is at least partly formed as a ring in this case, the holding-down punch, as described above, preferably interacting with a radially projecting peripheral edge of the portion capsule, while the plunger acts preferably centrally on a portion capsule base of a trough-like portion capsule body, in particular made of plastic or a light alloy, to deform the trough-like body in order to push the dough portion out, in particular after the portion capsule has been moved against a blade for puncturing a capsule lid film by means of the holding-down punch and/or has been clamped between the holding-down punch and a capsule support and thus fixed for the pushing-out process.

In regard to the specific realization of the comparing means or the comparison of the electric motor signal with a reference signal, different embodiments are available. It is generally possible to realize an analog comparison, in which the analog motor signal, in particular a current consumption signal, is directly compared to a reference signal generated in the device, in particular by means of a comparator circuit. A realization of digital comparing means is preferred in which a large number of discrete values are compared to one another, i.e. a large number of electrical motor signals or levels are compared to corresponding reference signal levels or reference (limit) values, preferably these reference signal levels, which form the reference signal, preferably being stored in a memory as a table or mathematical function. In a preferred manner, the matching of the motor signal levels with the corresponding reference signal levels, which are position-specific for the force application element, is based on signals indicative of respective movement positions of the force application element along its movement path. In other words, during the monitoring or comparing, the monitoring means take into account a position of the force application element and/or holding-down position along the movement path by means of a signal indicative of the position via which a current or actual motor signal is matched with a reference signal or reference signal level stored, in particular, in a memory. The movement positions or a signal indicative of the movement position and the motor signal are preferably detected at any point during the movement and/or with a high frequency.

In regard to the sensing and/or forming of the signals indicative of the position, different possibilities are available. It is possible, for example, to directly detect the current position of the force application element along the movement path, for example by means of light barriers or magnetic coding, etc. In a preferred embodiment, the signals indicative of the position are identified by integrating rotation angles or rotations of a motor shaft of the electric motor or a rotating and/or pivoting unit coupled with the motor shaft of the electric motor to transmit the torque, in particular a gear wheel or an eccentric shaft or a lever arm, so that the resulting position of the force application element is indirectly deduced by means of at least one moving component mechanically coupled with the at least one force application element or by the detection of its partial movements and the integration thereof. Alternatively, it is also possible in principle to deduce the movement position of the force application element along the movement path by means of a time measurement.

In the preferred case of both a plunger and a holding-down punch moveable relative to the plunger being provided as force application elements, it is preferred, as described above, if they are driven or disposed to be driven by a common electric motor, for which purpose the plunger and the holding-down punch are mechanically coupled, in particular via an eccentric shaft which is driven by means of the electric motor and to which both the plunger and the holding-down punch are hinged, in particular at different peripheral and/or radial positions. When the plunger and the holding-down punch are mechanically coupled, the movement position of both the plunger and the holding-down punch can be deduced by integrating the number of rotations and/or the rotation angles of only one moving component of the mechanical coupling.

In a preferred manner, the monitoring means are initialized in an initial position of the force application element by, for example, operating a switch, in particular a micro switch, directly or indirectly by moving the force application element. Alternatively, initialization can be realized by means of a corresponding sensor system, such as a light barrier or a similar sensor unit. It is also conceivable to realize initialization in such a manner that a moving element of the capsule-emptying apparatus is moved against a mechanical stop and the fact that the force application element and/or the holding-down punch are/is in a (defined or desired) initial position is detected by measuring a current increase, for example. Irrespective of the specific form of initialization, it is essential that the signal indicative of the position is determined from an initial position defined by the initialization.

In order to detect the rotation angles or numbers of rotation, a rotating component, such as the motor shaft or a gear wheel or a pivoting arm can be assigned an encoder detecting the rotation angles and/or rotations of the said component from an initial position (initialization position). It is generally possible to convert the detected rotations or rotation angles of the motor shaft or of another rotating or pivoting component into the movement path and thus a movement position of the force application element along the movement path using a known transmission by means of a circuit or software of the monitoring means. This step can also be left out and motor signal levels can be matched with reference signal levels directly through an integrated (added up) number of rotations or integrated torsion angles (added up torsional angles).

BRIEF DESCRIPTION OF THE DRAWINGS

Further advantages, features and details of the invention can be derived from the following description of preferred exemplary embodiments and from the drawings.

In the following,

FIG. 1 is a sectional view of a domestic baking device realized according to the idea of the invention, comprising a plunger and a holding-down punch as force application elements, the latter being in an initial position, FIG. 2 is another operating state of the domestic baking device according to FIG. 1 in which a relative movement of the holding-down punch, the plunger and the portion capsule has taken place, and FIG. 3 is a diagram showing the curve of a reference signal over a movement path of a force application element and the signal curve of a motor signal, in this case a current consumption of the electric motor for moving the force application element.

DETAILED DESCRIPTION

In the figures, the same elements and elements having the same function are referenced with the same reference numerals.

In FIGS. 1 and 2, a domestic baking device 1 for baking a food product, a flat bread in the case at hand, from a dough portion (not shown) initially held in a portion capsule 2 is illustrated.

In order to introduce portion capsule 2 into a housing 3 of domestic baking device 1, a facultative capsule tray 4 is provided which can be pulled out of an opening at the front side of the housing. In the case at hand, capsule tray 4 also comprises a blade 5 against which portion capsule 2 is moveable for puncturing a capsule lid, as will described below. Furthermore, capsule tray 4 comprises a capsule support 6 against which portion capsule 2 is moveable in order to clamp or to fix portion capsule 2 by means of a plunger, which will be described below, during the actual emptying process. If there is no capsule tray 4, blade 5 and/or capsule support 6 can be permanently disposed in housing 3, i.e. not be removable by means of a tray, in which case the introduction of portion capsule 2 into an emptying position is realized in another way, for example through direct manual insertion or by means of a slide of the same injection direction. Additionally, it is generally possible to dispense with the capsule support—in this case, only a blade is preferably provided against which the portion capsule is moved by means of a holding-down punch and/or a plunger.

After removing the dough portion from portion capsule 2, the portion capsule is moved to a baking body (not shown) in which the dough portion is baked in the form of a flat bread, preferably after a prior flattening, and is discharged afterwards.

Domestic baking device 1 comprises a capsule-emptying apparatus 7 comprising a plunger 8 for applying force to and thus deforming portion capsule 2 and thus pushing the dough portion out of portion capsule 2, in particular after portion capsule 2 has been opened. For opening portion capsule 2, first, portion capsule 2 is moved against ring blade 5 by means of a holding-down punch 9 and then, after a capsule lid 10 has been punctured by blade 5, against capsule support 6 in order to fix portion capsule 3 for the pressing process by means of plunger 8.

Plunger 8 and holding-down punch 9 are force application elements of domestic baking device 1 which, in the case at hand, are being moved in a mechanically coupled movement along respective exemplary translational movement paths from, referring to the drawing layer, top to bottom towards portion capsule 2. An electric motor, by which an eccentric shaft 11 is rotatable, is provided for driving both plunger 8 and holding-down punch 9, plunger 8 and holding-down punch 9 being hinged to eccentrics of eccentric shaft 11 at different peripheral and radial positions resulting in a common movement during which plunger 8 and holding-down punch 9 are moved not only relative to or towards portion capsule 2 but also relative to one another.

In the case at hand, by way of example, eccentric shaft 11 is assigned an encoder (not shown) by means of which the rotation angles of eccentric shaft 11 are detected and added up or integrated by monitoring means (not shown), which are signal-connected to the encoder and comprise a microcontroller in the case at hand, whereby a movement position of plunger 8 and holding-down punch 9 along their exemplary translational movement path can be deduced. A reference signal level of a reference signal 12 (cf. FIG. 3) is assigned to each movement position. Reference signal 12 thus refers to a limit value signal whose signal curve is plotted over the movement path s of plunger 8 and holding-down punch 9. A current consumption I is provided as a reference signal in the case at hand. A motor signal 13, a current consumption signal in the present case, made available to the monitoring means over the movement path is compared to said reference signal 12, resulting in a comparison of motor signal curve 13 over movement path s with a reference signal curve 12 over movement path s. In an exemplary manner only, motor signal 13 exceeds reference signal 12 at a movement path position $s_1$ in circled section 15. Thus, the motor current consumption in section 15 is too high compared to reference signal 12 so that the monitoring means detect an error which can be caused, for example, by the fact that the plunger and/or the holding-down punch are moved against a portion capsule introduced or positioned incorrectly and/or that the dough portion is frozen and/or a portion capsule not approved for the domestic baking device is moved. As a result, the monitoring means trigger an action, for example the return of plunger 8 and holding-down punch 9 to respective initial positions. An initialization takes place before each movement of plunger 8 and holding-down punch 9, for example by operating a micro switch 16 at or shortly after the initial position; of course, alternative initialization options can be implemented, as well.

From FIG. 2 it can be seen that holding-down punch 9 interacts with a radially projecting peripheral edge 17 of portion capsule 2 by applying force. In the operating state according to FIG. 2, plunger 8 has not reached portion capsule 2. If eccentric shaft 11 continues to be pivoted counterclockwise, plunger 8 comes into contact with a base 18 of a trough-shaped capsule body 19 and deforms it, the dough portion being pushed out of portion capsule 2, more precisely capsule body 19, and passing through, in particular falling through, a passage opening 20 of blade 5 in order to be baked and, if necessary, deformed, preferably flattened.

REFERENCE SIGNS 1 domestic baking device
2 portion capsule
3 housing
4 capsule tray
5 blade
6 capsule support
7 capsule-emptying apparatus
8 plunger
9 holding-down punch
10 capsule lid
11 eccentric shaft
12 reference signal
13 motor current consumption
15 section
16 micro switch
17 peripheral edge
18 base
19 capsule body
20 passage opening
s movement path
I current consumption

The invention claimed is:

1. A domestic baking device for baking a food product, from a dough portion initially held in a portion capsule (2), the domestic baking device comprising a baking apparatus for baking the dough portion and a capsule-emptying apparatus (7) for removing the dough portion from a portion capsule (2), the capsule-emptying apparatus (7) having at least one force application element, which can be moved along a movement path, for applying force to the portion capsule (2), which force application element can be driven by means of an electric motor, wherein
the capsule-emptying apparatus (7) is assigned monitoring means for monitoring the portion capsule emptying operation, the monitoring means comprising comparing means, which are designed to monitor the curve of an electrical motor signal, over the movement path of the force application element for the reaching or exceeding of a reference signal (12), which changes over the movement path of the force application element, and to perform an action if the reference signal (12) is reached or exceeded.

2. The domestic baking device according to claim 1, wherein a plunger (8) for deforming the portion capsule (2) for removing the dough portion from the portion capsule (2) is provided as a force application element and/or wherein a holding-down punch (9), being adjustable in particular relative to the plunger (8), for moving the portion capsule (2) against a blade (5) for puncturing a lid film of the portion capsule (2) and/or for clamping the portion capsule (2) between the holding-down punch (9) and a capsule support (6) are/is provided as a force application element.

3. The domestic baking device according to claim 1, wherein the monitoring means are configured to match reference signal levels of the reference signal (12) with motor signal levels of the motor signal via signals indicative of respective movement positions of the force application element along the movement path.

4. The domestic baking device according to claim 3, wherein the monitoring means are configured to determine the signals indicative of the position by integrating rotation angles or rotations of a motor shaft of the electric motor or of a rotating and/or pivoting unit coupled with the motor shaft of the electric motor to transmit a torque.

5. The domestic baking device according to claim 4, wherein initialization means for setting an initial position for the integration are assigned to the monitoring means.

6. The domestic baking device according to claim 4, wherein the monitoring means are configured to determine the signals indicative of the position by integrating rotation angles or rotations of a gear wheel or an eccentric shaft (11) or a lever arm.

7. The domestic baking device claim 3, wherein a memory in which the reference signals are stored with the associated position information is assigned to the monitoring means.

8. The domestic baking device according to claim 7, wherein the reference signals are reference signal levels.

9. The domestic baking device according to claim 1, wherein reference signal levels increase along the movement path of the force application element towards a capsule support (6) and/or a blade (5).

10. The domestic baking device according to claim 1, wherein the monitoring means are configured in such a manner that the action is or comprises putting out a warning signal, and/or wherein the action is or comprises stopping or slowing down the movement of the force application element towards the support and/or returning the force application element to an initial position.

11. The domestic baking device according to claim 1, wherein the food product is a flat bread, wherein the force is a force for deforming and/or moving the portion capsule (2), and wherein the electrical motor signal is a current or voltage signal.

12. A method for operating a domestic baking device (1), for baking a food product, a force application element in a capsule-emptying apparatus (7) of the domestic baking device (1) for removing a dough portion from a portion capsule (2) being driven by an electric motor in such a manner that it is moved along a movement path and applies force to the portion capsule (2),
wherein
a curve of an electrical motor signal, over the movement path of the force application element is monitored for the reaching or exceeding of a reference signal (12), which changes over the movement path of the force application element, and an action is performed if the reference signal (12) is reached or exceeded.

13. The method according to claim 12, wherein the dough portion is baked if no action is performed.

14. The method according to claim 13, wherein the dough portion is baked if no action is performed after and/or during a flattening of the dough portion.

15. The method according to claim 12, wherein motor signal levels are compared to reference signal levels, in order to monitor the curve of the electrical motor signal during the movement, motor signal levels and reference signal levels to be compared being matched via signals indicative of the position of respective movement positions of the force application element along the movement path.

16. The method according to claim 15, wherein the reference signal levels are stored in a memory.

17. The method according to claim 15, wherein the signals indicative of the position are determined by integrating rotation angles or rotations of a motor shaft or of a rotating or pivoting unit coupled with the motor shaft to transmit a torque.

18. The method according to claim 17, wherein a sensor for detecting the rotation angles and/or rotations is initialized prior to the integration to define an initial position of the force application element.

19. The method according to claim 12, wherein the reference signal levels increase along the movement path of the force application element towards the portion capsule (2).

20. The method according to claim 12, wherein as the action, a warning signal is output and/or the movement of the force application element towards the portion capsule (2) is stopped or slowed down and/or the force application element is returned to the initial position through corresponding driving of the electric motor.

* * * * *